United States Patent [19]
Kashio

[11] 4,145,753
[45] Mar. 20, 1979

[54] COMPARING APPARATUS FOR VARIABLE LENGTH WORD

[75] Inventor: Toshio Kashio, Tokyo, Japan

[73] Assignee: Casio Computer Co., Ltd., Tokyo, Japan

[21] Appl. No.: 843,522

[22] Filed: Oct. 19, 1977

[30] Foreign Application Priority Data

Oct. 20, 1976 [JP] Japan .................................. 51/125637

[51] Int. Cl.² .......................... G06F 7/34; G06F 7/28; G06F 13/00
[52] U.S. Cl. .................................................. 364/900
[58] Field of Search ... 364/200 MS File, 900 MS File

[56] References Cited
U.S. PATENT DOCUMENTS

| | | | |
|---|---|---|---|
| 2,865,567 | 12/1958 | Booth | 364/900 |
| 3,931,612 | 1/1976 | Stevens | 364/900 |

Primary Examiner—James D. Thomas
Attorney, Agent, or Firm—Flynn & Frishauf

[57] ABSTRACT

A comparing apparatus for comparing variable length word information comprises: first and second memory means for storing record information to be compared, each record information including a plurality of variable length word information arranged in series fashion with intervention of word boundary codes; means for specifying the address of the word information to be compared and for directing whether the specified word information are to be compared truing up the most significant digits or the least significant digits; means for comparing the specified word information in accordance with the direction from the specifying and directing means; and means for reading out the record information from the memory means specified in accordance with the result of the comparison of the comparing means.

5 Claims, 4 Drawing Figures

COMPARING APPARATUS FOR VARIABLE LENGTH WORD

BACKGROUND OF THE INVENTION

The invention relates to a comparing apparatus for comparing variable length word information including numerical information and a sorting code as well.

Generally, a sales slip, for example, to be processed by a computer is expressed in terms of record information including a plurality of pieces of word information corresponding to the respective items such as "bill number", "data", "customer", "unit price", "article", "quantity", "total amount", etc. The digit number of the numerical information such as "quantity" and "total amount", is variable. Therefore, it is desirable to use variable length word information for expressing the numerical information. On the other hand, the sorting code such as "customer" and "article" is expressed by a fixed length word information with a fixed number of bits. However, there often occurs a case where after those items are coded and sorted, further sorting is required. In such a case, it is highly preferable to increase the number of digits of the sorting code. For example, the customer code is a combination of items such as "region", "kind of shop", "serial number" and the like. For the "region", Tokyo is designated by "1" and Osaka by "2", for example. For the "kind of shop", supermarket is designated "1" and department store by "2". The code "123" is given to the department store with the serial number "3" located in Tokyo. When a branch store is set up in Tokyo, in coding such, it is convenient to add an additional number to the original code rather than to use a new serial number when the customer code is taken into consideration. In this case, the new coded number is "1231".

Thus, a variable digit length code is necessary for the same customer code. Therefore, it is desirable to use a variable length word for the sorting code as well as the numerical information. However, the relative length deciding means for the numerical information can not be used for deciding the relative lengths of the sorting codes. In the numerical information, the highest priority is given to the number of the digits constituting the numerals when the relative lengths thereof are decided. However, such is nonvalid for the sorting code. More precisely, in the numerical information, comparison is made turing up or registering the lower digits, while, in the sorting code, it must be made with registration of the upper digits.

In other words, the comparing means of the sorting information is different from that of the numerical information. When a number of record information are pigeonholed with customers, quantity and the like, it is difficult to use the variable length word for the customer sorting code. That is, if the digit number of the sorting code is fixed, the same hardware as of the numeral information may be used for deciding the sorting order of the sorting codes. Conversely if it is variable, such hardware is not used for the same purpose.

Accordingly, the primary object of the invention is to provide a comparing apparatus for comparing variable length word information in which the relative lengths of the information may be surely decided even when the sorting code as well as the numerical information are variable in information length.

SUMMARY OF THE INVENTION

To achieve this object, there is provided a comparing apparatus for comparing variable length word information comprising: first and second memory means each for storing record information including a plurality of variable length word information arranged in series fashion with intervention of word boundary codes; first means for specifying the address of at least one word in the record information stored in each of the first and second memory means; second means for directing whether the words specified by the first means are to be compared truing up the most significant digits or the least significant digits; third means for reading out the words specified by the first means and for comparing these words in accordance with the direction by the second means; and fourth means for specifying one the first and second memory means in accordance with the result of the comparison from the third means and for reading out one record information from the memory means specified.

With such a construction, the comparing apparatus can compare the relative lengths of the variable length sorting code as well as the variable length numerical information. Accordingly, it ensures the comparing operation of the record information including the variable length sorting code. Therefore, processing of business matters by the computer may be smoothly executed with further expandable detailed sorting.

DETAILED DESCRIPTION

Figure 1:
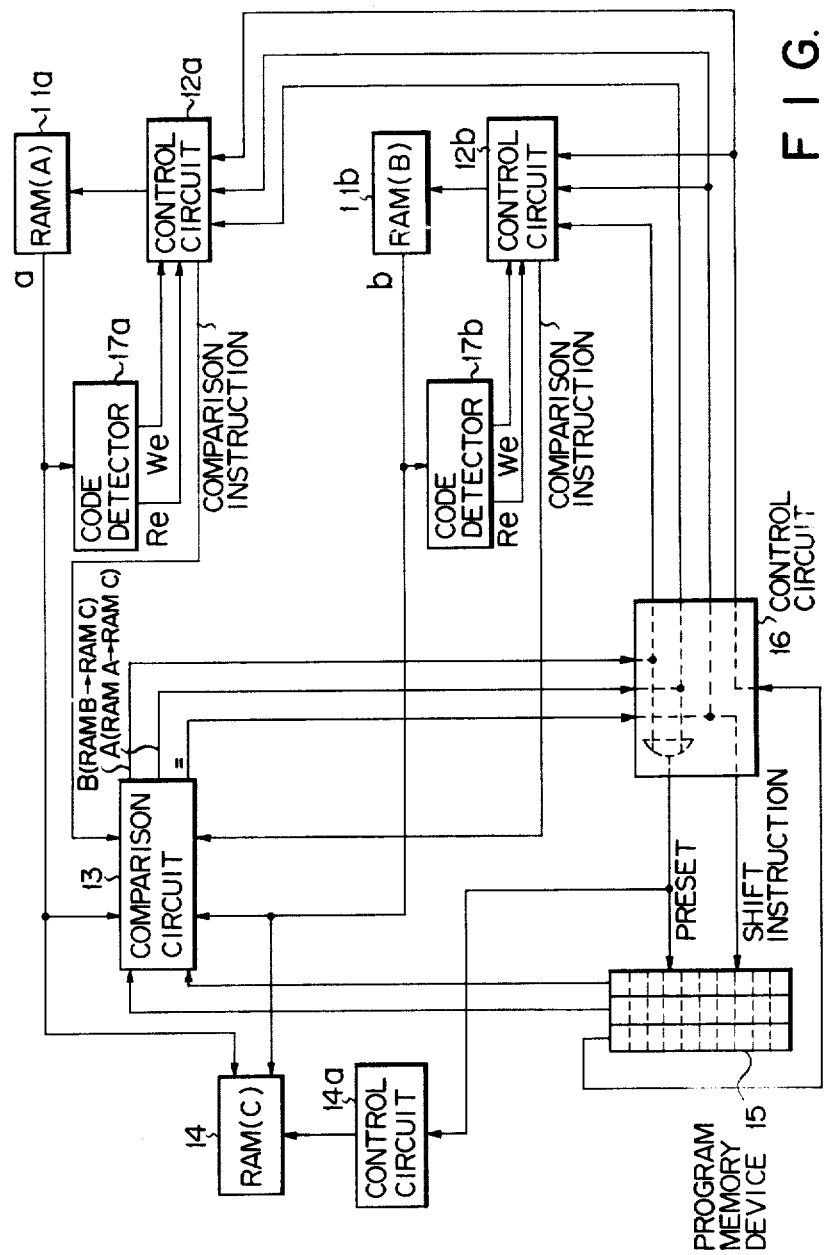
FIG. 1 shows a block diagram of a comparing apparatus for comparing variable length information according to the invention.
Figure 2:
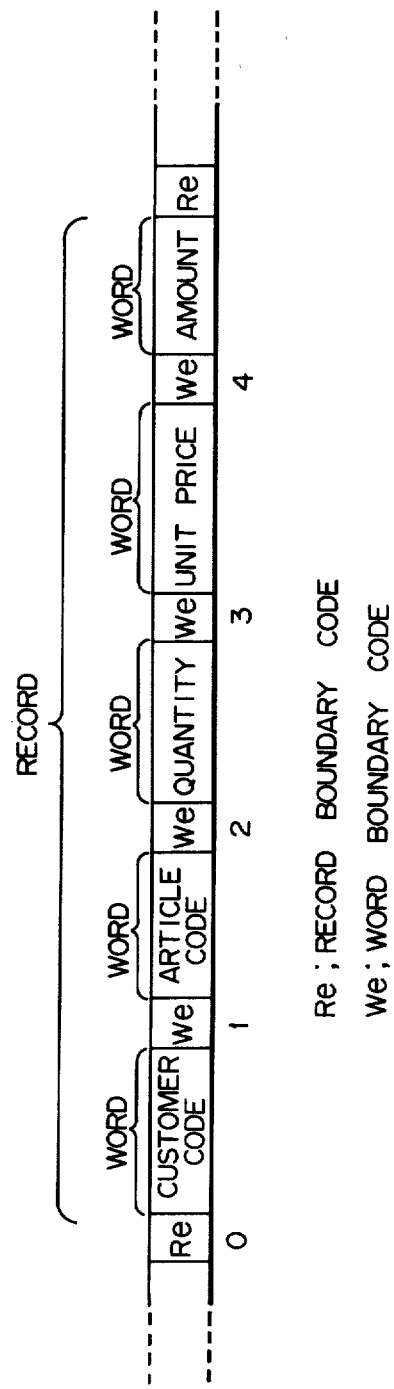
FIG. 2 shows an arrangement of a record information in a memory device.

Referring now to FIG. 1, there is shown an embodiment of the invention. The explanation of the invention will start with an assumption that two record information to be compared of a number of record information are stored in first and second memory devices 11a and 11b constructed by random access memories (RAMs), for example. The format of each record information stored in the memory devices 11a and 11b is such that a plurality of variable word information stored in the memory devices 11a and 11b are arranged in series fashion with intervention of word boundary codes. FIG. 2 shows the format of a single record information, in which Re designates a record boundary code and We a word boundary code. A number of record information serially arranged with record boundary codes inserted there among are stored in a memory device (not shown). The write and read operations of the information to and from the first and second memories 11a and 11b are placed under the control of control circuits 12a and 12b, respectively. The information addressed and read out by the control circuits 12a amd 12b are fed to a comparison circuit 13 and a memory 14.

Reference numeral 15 designates a program memory device in which the address instruction signal of the word to be directly compared of the record information to be compared and trued up or registered is loaded and specified. Also, the program memory device 15 has stored a signal to decide whether the word information with the address specified is taken in an ascending or descending scale ("1" is used for a descending order instruction and "0" for an ascending order instruction), and an upper digit registration instruction signal or a lower digit registration instruction signal. In the comparing operation, the upper or lower digit registration depends on the kind of the information of the numerical information and the sorting information. "0" is assigned for the upper digit registration instruction to direct execution of the comparing operation by turing up or registering the upper digits of the words to be compared; "1"for the lower digit registration instruction to direct the execution by registering the lower digits of them.

There is a case, for example, where, in taking from the memory the record information each of which is a combination of word information such as, for example, "customer code", "article code", "quantity", "unit price", "amount" and the like, priority is first given to a small amount of the one and then priority is given to a smaller customer code. In this case, the amount column (address number "4") is specified and the amounts are compared. When the amounts are equal, the customer codes (address number "0") are compared to find the orders of them in the arrangement. To this end, the programs are mapped as in the following table in the program memory device 15.

|   | I | II | . . . . . . . . |
|---|---|---|---|
| X | "1" (lower digit) | "0" (upper digit) | . . . . . . . . |
| Y | "0" (ascending) | "0" (ascending) | . . . . . . . . |
| Z | "4" (amount) | "0" (customer) | . . . . . . . . |

In response to a shift instruction, the contents of the program memory device 15 are read out sequentially in the order of I, II ... . These instruction signals represented by "1" or "0" taken therefrom are applied to the comparison circuit 13. The numerical information with addressing such as "amount" with address number "4" and "customer" with address number "0" are applied as addressing information to the control circuits 12a and 12b, through a control unit 16. Upon receipt of the instruction signal fed from the program memory device 15, the comparison circuit 13 compares word information a taken from the memory device 11a with that b from the memory device 11b, and it produces "A", "B" or "= (equal)" output signal toward the control unit 6. The signal A is a command to read record information from the memory device 11a; B an instruction to read record information from the memory device 11b. Then, the record information including the word information selected and compared are taken from the memory device 11a or 11b and then loaded into the memory device 14 of RAM, for example. When the "=" command is produced by the comparison circuit 13, a shift command is given to the program memory 15 via a control circuit 16 to read out therefrom the ensuing comparing condition. When the comparison circuit 13 produces the read-out command "A" or "B", the control circuit 16 issues a preset command to the program memory 15 to place it at the initial read-out condition, and at the same time to send a write-in command to the memory device 14, through a control circuit 14a.

Reference numerals 17a and 17b designate detectors for detecting the word boundary code (We) and the record boundary code (Re) in the record information taken from the memory devices 11a and 11b thereby to control the control circuits 12a and 12b. The control circuits 12a and 12b produce signals indicating current read-out of the word information which in turn are fed to the comparison circuit 13 where they are used to find number of digits of the information and the like.

Figure 3:
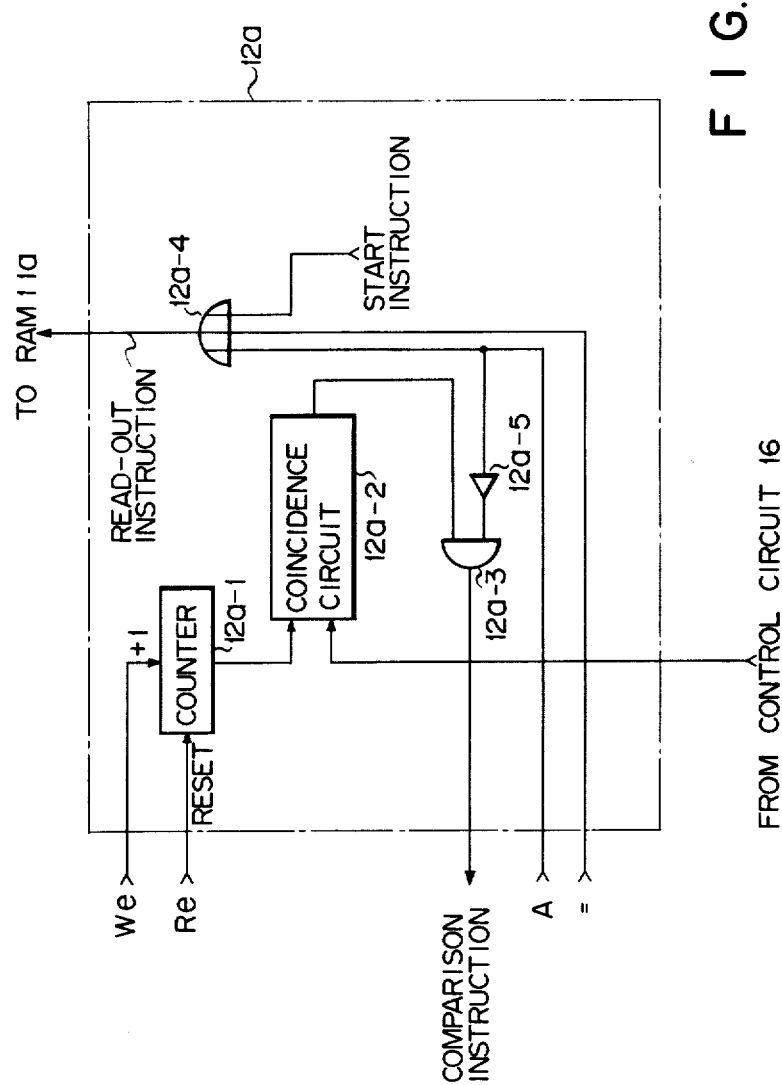
FIG. 3 is a circuit diagram of a control circuit for controlling the reading-out from the memory device in FIG. 1.

The details of each control circuits 12a and 12b is illustrated in FIG. 3. In FIG. 3, reference numeral 12a-1 indicates a counter to detect the address locations of a plurality of words in the record information and is reset by the record boundary code Re detected by the code detecting circuit 17a and successively stepped by the word boundary code We detected by the detecting circuit 17b. The output signal of the counter 12a-1 is transferred to a coincident circuit 12a-2. Also, the coincident circuit 12a-2 receives numerical information for addressing the word to be compared fed from the program memory through the control circuit 16. The coincidence between the output of the counter 12a-1 and the numerical information causes the coincidence circuit 12a-2 to produce a coincidence signal which in turn is applied as the current read-out signal to the comparison circuit 13, through and AND circuit 12a-3. A read-out instruction signal from the leading address of the record information stored in the memory device 11a is taken from the control circuit 12a through an OR circuit 12a-4. That is, a start instruction signal to start the read-out, the equal "=" instruction signal from the control circuit 16, and "A" instruction signal from the comparison circuit 13 are applied to the OR circuit 12a-4. In response to these instruction signals, the read-out of the record information from the RAM 11a starts, the record information being successively taken from the head thereof. The "A" instruction signal from the comparison circuit 13 is fed to the AND circuit 12a-3. At this time, the AND circuit 12a-3 is disabled to block outputting of the current read-out signal therefrom.

With such a construction, the record information to be compared are stored in the first and second memory devices 11a and 11b, respectively. At the initial stage c the comparison instruction, signals for addressing th words to be firstly compared are directed to the coincident circuits 12a-2 and 12b-2 of the control circuits 12 and 12b, respectively. With the arrangement of th program stored in the program memory 15 as shown i the above-mentioned table, the word information a an b to be read out which correspond to the amount co umns with address number "4", of the record informa tion stored in the memory devices 11a and 11b are tran: ferred to the comparison circuit 13. These word infor mation a and b are compared therein in response to th lower digit registration instruction and the ascendin, comparison instruction fed from the program memor device 15. When the result of the comparison is th instruction "A" indicating selection of the word infor mation from the first memory device 11a, the read-ou instruction from the leading address from the OR ci cuit 12a-4 of the control circuit 12a drives the contrc circuit 12a to read out the record information from th first memory device 11a. At this time, the control ci cuit also issues an instruction to the control circuit 14 thereby to load the record information read out into th memory 14 and to preset the program memory 15 to th initial condition.

On the other hand, in the case of the instruction "B" the instruction read out from the leading address out putted from the OR circuit 12b-4 of the control circuit 12b loads the record information stored in the second memory device 11b into the memory device 14. Additionally, when the comparison circuit 13 produces the equal instruction "=", a shift instruction is given to the program memory 15. Then, the address information are specified to read out the word information from the first and second memory devices 11a and 11b and the comparing operation is carried out as previously stated. According to the result of the comparison, the memory device 11a or 11b is specified to push the record information from the specified memory device 11a or 11b is not the memory 14.

Figure 4:
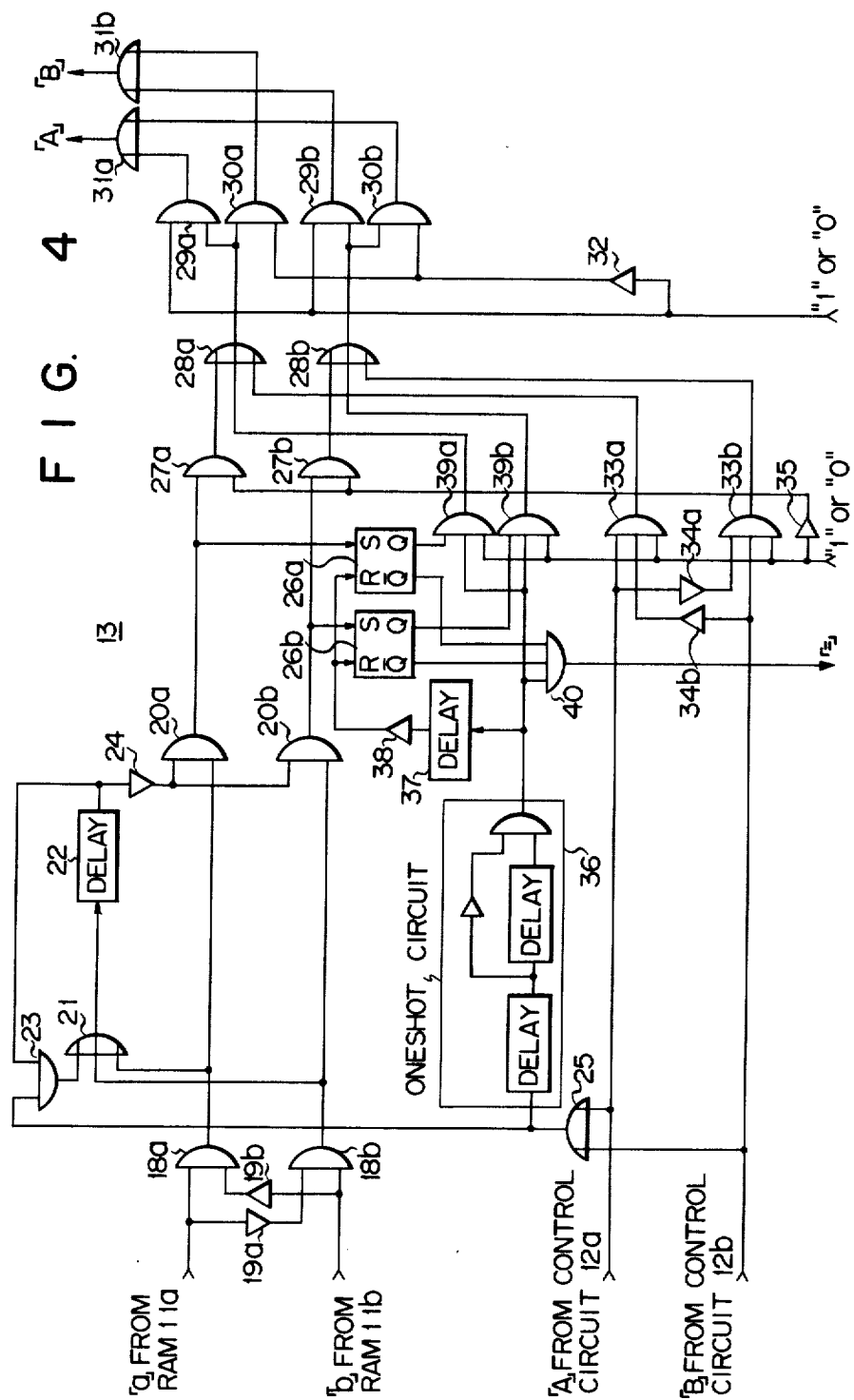
FIG. 4 is a circuit diagram of a comparison circuit shown in FIG. 1.

FIG. 4 shows a circuit diagram of a comparison circuit 13 used in the above-mentioned circuit. The information a read out from the first memory 11a is successively fed to an AND circuit 18a, from weighted upper bit to the lower bit. The same thing is true of the information b associated with the memory 11b and an AND circuit 18b. The output signals of INVERTERs 19a and 19b which couple the bit input information a with that b are used to control AND circuits 18a and 18b. In other words, the AND circuits 18a and 18b cooperate to compare the input or incoming information each bit and produce an output signal when these are incoincident. In more particular, when the bit of one of the information is "1" and the bit of the other is "0", the AND circuit 18a or 18b with which the bit "1" is coupled produces an output signal. The output signals of the AND circuits 18a and 18b are supplied to the AND circuits 20a and 29b, and also to the OR circuit 21. The output of the OR circuit 21 is applied via a delay circuit 22 to an AND circuit 23 of which the output is coupled with the OR circuit 21. In this manner, the output signal of the AND circuit 21 circulates through the path of the delay 22, the AND circuit 23 and the AND circuit 21. The output signal of the delay circuit 24 is inverted by an INVERTER 24 to control the gates of the AND circuits 20a and 20b. The current read-out signals a and b in the first and second memory devices 11a and 11b from the control circuit 12a and 12b shown in FIG. 1 are detected by an OR circuit 25 and then is fed as a gate signal to the AND circuit 23.

Under a condition that the read-out information a and b are coupled with the AND circuits 18a and 18b, the current read-out signals a and b exist and thus the gate signal has been applied to the AND circuit 23. Under this condition, the AND gates 18a and 18b cooperate to execute the bit comparison and when they detect an incoincidence representing one of the bits being larger than the other, the detected signal is stored in the delay circuit 22 through the OR circuit 21, and goes by way of the AND gate 23 which has been enabled to circulate through the above-mentioned path. For this, the delay circuit 22 always stores "1" therein and then it disables the AND circuits 20a and 20b. And only the result of the bit comparison made just before the delay circuit 22 produces "1" is taken through AND circuits 20a and 20b to set a flip-flop circuit 26a or 26b, resulting in storing of the result therein.

The output signals of the AND circuits 20a and 20b are taken through AND circuits 27a and 27b and OR circuits 28a and 28b, respectively, and applied to AND circuits 29a and 29b, and AND circuits 30a and 30b, respectively. The output signals of the AND circuits 29a and 30b are applied to an OR circuit 31a, and the outputs of the AND circuits 30a and 29b to an OR circuit 31b. Through the OR circuit 31a or 31b, the first or second memory device 11a or 11b is specified to read out "A" or "B" of the instruction to read-out the record information. As will be recalled, the descending order signal is represented by logical "1" and the ascending order signal by logical "0". These signals are outputted from the program memory device 15 and instruction signals to decide whether the word information is taken in the descending order from large to small values or in the ascending order from small to large values. These signals are directly to the AND gates 29a and 29b or through an INVERTER 32 to the AND circuits 30a and 30b. The current read-out signals a and b are further coupled with AND circuits 33a and 33b, respectively. The AND circuits 33a and 33b are coupled by means of INVERTERs 34a and 34b to which the signals a and b are applied as shown. The AND circuits 33a and 33b are enabled by the lower digit registration signal "1" from the program memory 15 and the output signals of the AND circuits 33a and 33b are applied to the OR circuits 28a and 28b, respectively.

From the first and second memories 11a and 11b, the word information are successively taken in series fashion from the head of the information are successively taken in series fashion from the head of the information in synchronism with the bit. In this manner, the lengths of the respective one word information being taken from the memory devices 33a and 33b are compared by means of the AND circuits 33a and 33b so that the digit numbers of the word information concurrently read out are compared. That is, in numerical information, the values of them are compared. It can thus be found which information is larger in the digit number or the value.

The upper digit registration instruction signal "0" fed from the program memory 15 is applied to an INVERTER 35 where it becomes effective in gate control. That is, the output of the INVERTER 35 is applied to AND gates 27a and 27b to enable them.

The output signal of the OR circuit 25 for detecting the current read-out signals a and b is applied to a one-shot circuit 36. The one-shot circuit 36 produces one-shot pulse at the fall time of the output signal from the OR circuit 25. The pulse signal generated is transferred via a delay circuit 37 to an INVERTER 38. The signal from the INVERTER 38 resets flip-flop circuits 26a and 26b. The output of the one-shot circuit 36 is coupled with AND circuits 39a, 39b and 40. The output signals of the flip-flop circuits 26a and 26b when these are set and the lower digit registration signal "1" as well as applied to the AND gates 39a and 39b of which the signal is coupled with the OR circuits 28a and 28b. The signals of the flip-flop circuits 26a and 26b when these are reset are applied to the AND circuit 40 which in turn produces the equal (=) signal of the comparing result.

In the comparing circuit 13 with such a construction, when the address information are the sorting words such as "customer", the upper digits of them are tured up and comparison of them is made from the upper to the lower digits in the descending order. At this time, the program memory device 15 provides the upper digit registration instruction signal "0" which is inverted by the INVERTER 35 and then is applied to the AND circuits 27a and 27b. Under this condition, "customer codes" specified are taken from the first and second memory devices 11a and 11b, successively from the heads to the tails of the codes, and then applied to the AND circuits 18a and 18b. At this time, the bits constituting the respective codes are successively compared from the upper to the lower digits. And when one of the bits is "1" and the other "0", the AND circuit 18a or 18b to which "1" is coupled produces an output signal. For example, when the AND circuit 18a produces the output signal, the code information a is larger than the information b. The output signal goes through the AND circuits 20a and 27a and the OR circuit 28a to the AND circuits 29a and 30a. When the program memory device 15 stores the program to output the word information in the ascending order, the AND gate 30a has had a gate signal at one input and thus the output signal of the OR circuit 31b enables the AND circuit 30a to produce the instruction signal "B" to instruct the read-out of the word information in the second memory 11b.

At this time, the upper digit registration instruction has been given, so that the AND circuits 33a and 33b remain disabled and no comparison is carried out between the word lengths. Further, the output signals of the AND circuits 20a and 20b are compared from the upper digit to the lower to set one of the flip-flop circuits 26a and 26b. However, the output of the flip-flop set is not used.

Then, the read-out operation from the first and second memory devices 11a and 11b is completed and the current read-out signals a and b have fallen. At this time, the one-shot circuit 36 produces an output signal to reset the flip-flop circuits 26a and 26b to the initial state.

When one of the AND circuits 18a and 18b produces an output signal, the comparing output circulates the path of the delay circuit 22, the AND circuit 23 and the OR circuit 21. The output of the delay circuit 22 disables the AND circuit 20a through the INVERTER 24 to stop a further comparing operation of the further lower bits. The reason for this is that, when the relative word lengths are found at the upper bits comparison, it is unnecessary to compare the further lower bits. The information circulating in the path is removed as the current read-out signal falls.

Under the above-mentioned condition, the word information read out from the first and second memory devices 11a and 11b are equal, none of the AND circuits 18a and 18b produces an output signal and the current read-out signals a and b falls off. That is, both of the flip-flop circuits 26a and 26b are in reset state and the one-shot circuit 36 produces an output signal. At this time, the AND circuit 40 produces the equal (=) signal.

The case described so far relates to the upper digit registration of the sorting codes. In the case of numerical information comparison, the program memory 15 provides the lower digit registration instruction signal "1" to the comparison circuit 13. In more particular, gate signals are applied to the AND gates 33a and 33b, and 39a and 39b. Under this condition, the word informations a and b read out from the first and second memories 11a and 11b are coupled with the AND circuits 18a and 18b so that these are compared from the upper to the lower bits. The result of the comparing is stored in the flip-flops 26a and 26b. The word information a is assumed to be larger than that of b. In such a case, it is stored in the flip-flop 26a in the set state. At this time, the AND gates 27a amd 27b are prohibited so that no comparison output is produced from the combination of the AND gates 18a and 18b, unlike the sorting code comparison.

On the other hand, signals a and b are compared by means of the combination of the AND circuits 33a and 33b. The larger of the two signals enables one of the AND circuits 33a and 33b to drive the corresponding OR circuit 28a or 28b. In this manner, the OR circuit 31a or 31b produces an output representing the result of the comparison, corresponding to the instruction signal of the ascending or descending order.

In case where the digit number of the words to be compared from the first and second memory devices 11a and 11b are equal, no output is produced from the AND circuits 33a and 33b. The AND circuit 39a or 39b which are disabled as the current read-out signal falls off, detects the set state of the flip-flop circuit 26a or 26b to send as output representing the relative lengths to the OR circuit 28a or 28b.

As seen from the foregoing description, the comparing apparatus according to the invention can compare the relative information lengths of the variable length numerical information and the variable length sorting code as well. This ensures the comparing operation of the record information including the variable length sorting code.

Therefore, the items such as "customer" and "article" may be most efficiently sorted and coded in accordance with the sorting condition but regardless of the digit number thereof. Further, these items once sorted are additionally sorted in further expandable or detailed manner. Thus, business matters and technical information may be smoothly processed by computers with simplification of programs needed.

What is claimed is:

1. A comparing apparatus for comparing the variable length, comprising information: first and second memory means each for storing record information including a plurality of variable length word information arranged in series fashion with intervention of word boundary codes; first means for specifying the address of at least one word in the record information stored in each of said first and second memory means; second means for directing whether the words specified by said first means are to be compared truing up the most significant digits or the least significant digits; third means for reading out the words specified by said first means and for comparing these words in accordance with the direction by said second means; and fourth means for specifying one of said first and second memory means in accordance with the result of the comparison from said third means and for reading out one record information from said memory means specified.

2. A comparing apparatus according to claim 1, in which said first memory means and said second memory means each comprise a random access memory.

3. A comparing apparatus according to claim 1, further including third memory means for storing one record information read out of said fourth means.

4. A comparing apparatus according to claim 3 in which said third memory means comprises a random access memory.

5. A comparing apparatus according to claim 1 in which said first means and said second means comprise a program memory device, and means for executing respective programs stored in said program memory device.

* * * * *